(12) United States Patent
Zhou et al.

(10) Patent No.: US 10,096,132 B2
(45) Date of Patent: Oct. 9, 2018

(54) METHOD AND APPARATUS FOR POSITIONING FEATURE POINT

(71) Applicant: Samsung Electronics Co., Ltd., Suwon-si, Gyeonggi-do (KR)

(72) Inventors: Mingcai Zhou, Beijing (CN); Jingu Heo, Yongin-si (KR); Tao Hong, Beijing (CN); Weiming Li, Beijing (CN); Zairan Wang, Beijing (CN); Zhihua Liu, Beijing (CN); Dong Kyung Nam, Yongin-si (KR); Haitao Wang, Beijing (CN)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 25 days.

(21) Appl. No.: 15/416,271

(22) Filed: Jan. 26, 2017

(65) Prior Publication Data
US 2017/0213359 A1      Jul. 27, 2017

(30) Foreign Application Priority Data
Jan. 27, 2016   (CN) .................. 2016 1 00534559

(51) Int. Cl.
| | |
|---|---|
| *G06T 7/70* | (2017.01) |
| *G06T 7/73* | (2017.01) |
| *G06K 9/46* | (2006.01) |
| *G06T 7/40* | (2017.01) |

(Continued)

(52) U.S. Cl.
CPC ............ *G06T 7/73* (2017.01); *G06K 9/00248* (2013.01); *G06K 9/00664* (2013.01); *G06K 9/4604* (2013.01); *G06K 9/6209* (2013.01); *G06K 9/6256* (2013.01); *G06T 7/40* (2013.01);
(Continued)

(58) Field of Classification Search
CPC . G06T 2207/30201; G06T 2207/20081; G06T 15/04; G06T 2207/10004; G06T 7/40; G06T 7/73; G06T 7/33; G06T 7/35; G06K 9/00315; G06K 9/00281; G06K 9/00335; G06K 9/6209; G06K 9/4604;
(Continued)

(56) References Cited

U.S. PATENT DOCUMENTS

| | | | |
|---|---|---|---|
| 6,259,802 B1 * | 7/2001 | Jolly ................... | G06K 9/3216 382/103 |
| 8,121,347 B2 * | 2/2012 | Metaxas ............ | G06K 9/00335 382/103 |

(Continued)

OTHER PUBLICATIONS

T.F. Cootes and C.J.Taylor, Statistical Models of Appearance for Computer Vision, 2004.

*Primary Examiner* — Manav Seth
(74) *Attorney, Agent, or Firm* — Harness, Dickey & Pierce, P.L.C.

(57) ABSTRACT

A feature point positioning apparatus includes a memory storing computer-executable instructions; and one or more processors configured to execute the computer-executable instructions such that the one or more processors are configured to, iteratively update a first form coefficient based on, a nonlinear feature extracted from an image, and a regression factor matrix obtained through training, and detect a position of the feature point of the image based on, the updated first form coefficient, and a statistical form model obtained through training.

20 Claims, 8 Drawing Sheets

(51) Int. Cl.
  *G06K 9/62* (2006.01)
  *G06K 9/00* (2006.01)
(52) U.S. Cl.
  CPC .............. *G06T 2207/10004* (2013.01); *G06T 2207/20081* (2013.01); *G06T 2207/30201* (2013.01)
(58) Field of Classification Search
  CPC ....... G06K 2009/4695; G06K 9/00248; G06K 9/00664; G06K 9/6256
  See application file for complete search history.

(56) References Cited

U.S. PATENT DOCUMENTS

| | | | | |
|---|---|---|---|---|
| 9,014,465 B2 * | 4/2015 | Metaxas | ............ | G06K 9/00335 382/159 |
| 9,104,908 B1 * | 8/2015 | Rogers | ............... | G06K 9/00315 |
| 9,111,134 B1 * | 8/2015 | Rogers | ............... | G06K 9/00302 |
| 9,959,462 B2 * | 5/2018 | Freeman | ............ | G06K 9/00375 |
| 2001/0026351 A1 * | 10/2001 | Gao | ..................... | G02C 13/003 351/227 |
| 2005/0238233 A1 * | 10/2005 | Mulet Parada | ....... | G06T 7/0012 382/199 |
| 2007/0031003 A1 * | 2/2007 | Cremers | ............ | G06K 9/6207 382/103 |
| 2008/0063263 A1 | 3/2008 | Zhang et al. | | |
| 2008/0187174 A1 * | 8/2008 | Metaxas | ............ | G06K 9/00335 382/103 |
| 2009/0252435 A1 | 10/2009 | Wen et al. | | |
| 2013/0124951 A1 | 5/2013 | Shechtman et al. | | |
| 2013/0294642 A1 | 11/2013 | Wang et al. | | |
| 2014/0133758 A1 | 5/2014 | Kienzle | | |
| 2015/0169938 A1 * | 6/2015 | Yao | .................... | G06K 9/00261 382/103 |
| 2016/0196665 A1 * | 7/2016 | Abreu | ..................... | G06T 11/00 345/427 |
| 2017/0154214 A1 * | 6/2017 | Freeman | ............ | G06K 9/00375 |
| 2017/0193662 A1 * | 7/2017 | Zhou | ............... | G06T 7/0012 |

\* cited by examiner

First layer          Second layer

FIG. 7

METHOD AND APPARATUS FOR POSITIONING FEATURE POINT

CROSS-REFERENCE TO RELATED APPLICATION

This application claims priority under 35 U.S.C. § 119 to Chinese Patent Application No. 201610053455.9, filed on Jan. 27, 2016, in the State Intellectual Property Office of the People's Republic of China, and Korean Patent Application No. 10-2016-0128386, filed on Oct. 5, 2016, in the Korean Intellectual Property Office, the entire contents of each of which are incorporated herein by reference in their entirety.

BACKGROUND

1. Field

At least one example embodiment relates to computer visual technology, and more particularly, to a method and apparatus for positioning a feature point.

2. Description of the Related Art

Face feature point positioning technology has been studied for the past 20 years and commonly still has a problem related to computer visual area. Face feature point positioning technology may be relatively difficult to employ due to lack of clarity or evenness with respect to certain elements, for example, a pose, a facial expression, and a light source. A relatively typical face feature point positioning technology may use various algorithms, and in general face feature point positioning technology is much more advanced these days.

However, existing algorithms may not be suitable for use on a mobile platform. As such, research on an algorithm that decreases the size of a model file, but is faster and more accurate, for use on a mobile platform, may be desirable.

SUMMARY

According to at least some example embodiments, a feature point positioning apparatus includes a memory storing computer-executable instructions; and one or more processors configured to execute the computer-executable instructions such that the one or more processors are configured to, iteratively update a first form coefficient based on, a nonlinear feature extracted from an image, and a regression factor matrix obtained through training, and detect a position of the feature point of the image based on, the updated first form coefficient, and a statistical form model obtained through training.

The one or more processors may be configured to execute the computer-executable instructions such that the one or more processors are configured to obtain a similarity transformation matrix by arranging an intermediate form and an average form obtained through an update, and perform a similarity transformation on the intermediate form and the image based on the similarity transformation matrix.

The one or more processors may be configured to execute the computer-executable instructions such that the one or more processors are configured to, arrange the intermediate form and the average form obtained through the update using a high resolution pyramid frame, perform positioning on a feature point of a first resolution image based on a threshold, and obtain the similarity transformation matrix by performing positioning on a feature point of a second resolution image and mapping, to the second resolution image, a result of the performing of the positioning on the feature point of the first resolution image, and a second resolution is higher than a first resolution.

The one or more processors may be configured to execute the computer-executable instructions such that the one or more processors are configured to perform inverse transformation, using a coordinate system of the image, on a feature point obtained based on the similarity transformation matrix obtained through an iterative update.

The one or more processors may be configured to execute the computer-executable instructions such that the one or more processors are configured to obtain a similarity transformation matrix $A_k$ used for a k-th iterative update of the first form coefficient using a target function $\arg\min_{A_k} \|S_0 - A_k \cdot s(P_k^i)\|^2$, $S_0$ denotes an average form, and $s(P_k^i)$ is an i-th sample form after the iterative update is performed k times.

The one or more processors may be configured to execute the computer-executable instructions such that the one or more processors are configured to determine the regression factor matrix based on the nonlinear feature and an extent to which a second form coefficient of a training sample is updated.

The one or more processors may be configured to execute the computer-executable instructions such that the one or more processors are configured to learn an average texture feature from the training sample and determine a value of a difference between the average texture feature and a nonlinear texture feature extracted from the training sample as a nonlinear feature of the training sample.

The one or more processors may be configured to execute the computer-executable instructions such that the one or more processors are configured such that a nonlinear texture feature is one type of the nonlinear texture feature or a combination of at least two types of the nonlinear texture feature, and the updater uses, in different iterations, the combination of at least two types of the nonlinear texture feature or identical nonlinear texture features and different nonlinear texture features.

The one or more processors may be configured to execute the computer-executable instructions such that the one or more processors are configured to determine the regression factor matrix by minimizing an error between the extent to which the second form coefficient is updated and an extent to which a third form coefficient is updated, calculated based on the nonlinear feature.

The one or more processors may be configured to execute the computer-executable instructions such that the one or more processors are configured to obtain a regression factor matrix $R_k$ used for a k-th iterative update of the third form coefficient using a target function $\mathrm{argmin}_{R_k} \sum_{i=1}^{N} \|\Delta p_k^i - R_k * \varnothing_k^i\|^2$, N denotes a total number of training samples, $\Delta p_k^i = p_*^i - p_k^i$, denotes the extent to which the second form coefficient of an i-th sample is updated when the iterative update is performed k times, $\varnothing_k^i$ denotes a nonlinear feature of the i-th sample when the iterative update is performed k times, and $R_k * \varnothing_k^i$, denotes the extent to which the third form coefficient is updated, obtained and calculated based on the nonlinear feature of the i-th sample, when the iterative update is performed k times.

According to at least some example embodiments, a method of positioning a feature point includes extracting a nonlinear feature of an image; iteratively updating a first form coefficient based on the nonlinear feature and a regression factor matrix obtained through training; and detecting a position of a feature point of the image based on the updated first form coefficient and a statistical form model obtained through training.

The updating may include obtaining a similarity transformation matrix by arranging an intermediate form and an average form obtained through an update; and performing a similarity transformation on the intermediate form and the image based on the similarity transformation matrix.

The obtaining may include arranging the intermediate form and the average form obtained through the update using a high resolution pyramid frame; performing positioning on a feature point of a first resolution image based on a threshold; and performing positioning on a feature point of a second resolution image by mapping, to a second resolution image, a result of the performing positioning on a feature point of a first resolution image, and a resolution of the second resolution image may be higher than a resolution of the first resolution image.

The method may further comprise performing inverse transformation, using a coordinate system of the image, on a feature point obtained based on the similarity transformation matrix obtained through an iterative update.

A similarity transformation matrix $A_k$ used for a k-th iterative update of the first form coefficient may be obtained using a target function arg $\min_{A_k} \|S_0 - A_k \cdot s(P_k^i)\|^2$, $S_0$ may denote an average form, and $s(P_k^i)$ may be an i-th sample form after the iterative update is performed k times.

The method may further comprise determining a nonlinear feature of a training sample; and obtaining the regression factor matrix based on the nonlinear feature of the training sample and an extent to which a second form coefficient of the training sample is updated.

The nonlinear feature of the training sample may include a nonlinear texture feature, and the determining of the nonlinear feature of the training sample may include learning an average texture feature from the training sample, and determining a value of a difference between the average texture feature and a nonlinear texture feature extracted from the training sample as a nonlinear feature of the training sample.

A nonlinear texture feature may be a combination of at least one type of the nonlinear texture feature, and the combination of at least one type of the nonlinear texture feature is used when the iterative update is performed.

The obtaining may include determining the regression factor matrix by minimizing an error between the extent to which the second form coefficient is updated and an extent to which a third form coefficient is updated, calculated based on the nonlinear feature of the training sample.

A regression factor matrix $R_k$ used for a k-th iterative update of the third form coefficient may be obtained using a target function $\mathrm{argmin}_{R_k} \sum_{i=1}^{N} \|\Delta p_k^i - R_k * \emptyset_k^i\|^2$, N may denote a total number of training samples, $\Delta p_k^i = p_*^i - p_k^i$ may denote the extent to which the second form coefficient of an i-th sample is updated when the iterative update is performed k times, $\emptyset_k^i$ may denote a nonlinear feature of the i-th sample when the iterative update is performed k times, and $R_k * \emptyset_k^i$ may denote the extent to which the third form coefficient is updated, obtained and calculated based on the nonlinear feature of the i-th sample, when the iterative update is performed k times.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments are described herein with reference to schematic illustrations of idealized embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

With development in scientific technology, existing mobile devices, in particular, a mobile phone and a tablet personal computer (PC), may all include front cameras. Using hardware, a feature point of a human face may be conveniently positioned through a front camera. Also, the existing mobile phone and the tablet PC may be capable of making complex calculations and may, therefore, be able to run a complex image processing algorithm using hardware.

According to at least some example embodiments, a feature point positioning algorithm of which a speed is relatively high, an accuracy is relatively high, and a size of a model file with respect to a mobile platform is relatively small, is proposed. A basic idea is to train a single statistical form model offline, extract a nonlinear feature of an image to be detected, iteratively update a form coefficient based on the nonlinear feature and a regression factor matrix obtained through training, and detect a position of the feature point of the image to be detected based on the statistical form model obtained through training and the updated form coefficient. According to at least some example embodiments, the statistical form model may be trained as different forms of models in advance and detect feature points corresponding to the forms and thus, a technical proposal provided by According to at least some example embodiments is not limited to a method of detecting a feature point of a human face. However, the technical proposal may include a method of positioning a feature point of a face of an animal, a body portion of an animal, and an ultrasonic image. In the present disclosure, description of a method of positioning a feature point of a human face is provided as an example.

For example, when a feature point of a human face is used, a trained statistical form model may represent forms of all normal human faces only based on ten left and right form coefficients. Compared to a complex model, the trained statistical form model may decrease a level of dimensions using a relatively small number of coefficients such that simple representation of the forms of the human faces is possible. Thus, performing the method of positioning the feature point of the human face obtains an optimal or, alternatively, desired form coefficient. A method of extracting a nonlinear feature as a linear regression may be used to obtain the optimal or, alternatively, desired form coefficient through an iterative update of the form coefficient and obtain a position of each feature point based on the statistical form model obtained through offline training. In such a process, a number of rows in the regression factor matrix may be identical to a number of coefficients of the statistical form model, and may be unrelated with a number of feature points. According to at least some example embodiments, the number of rows in the regression factor matrix is less than or equal to a ninth of a number of rows in a regression factor matrix of a conventional supervised descent method (SDM) algorithm. Thus, a size of a model file may be reduced and a speed may be increased while a positioning accuracy is maintained.

Figure 1:
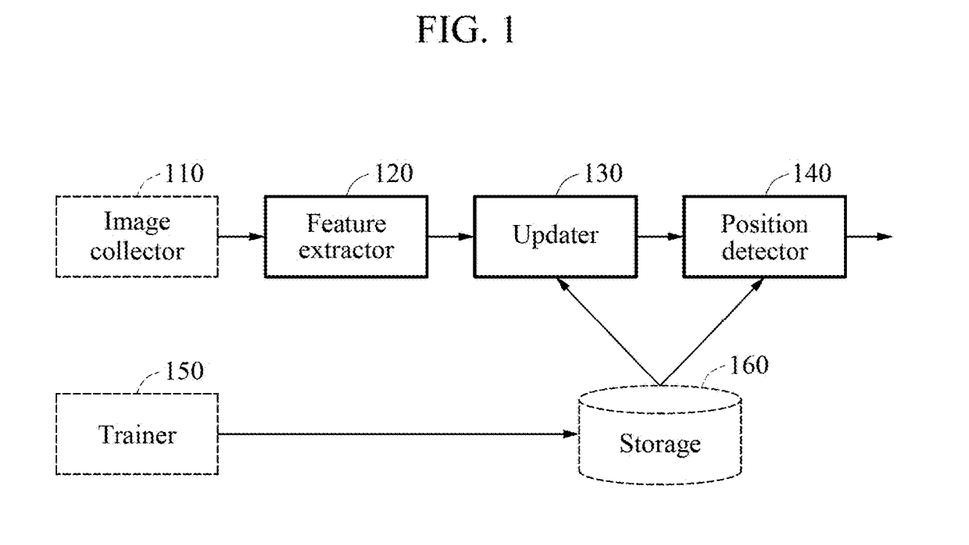
FIG. 1 illustrates a feature point positioning apparatus according to at least one example embodiment.

FIG. 1 illustrates a feature point positioning apparatus according to at least one example embodiment.

Referring to FIG. 1, a feature point positioning apparatus includes a feature extractor 120, an updater 130, a position detector 140, and may further include an image collector 110, a trainer 150, and a storage 160. The image collector 110, the trainer 150, and the storage 160 are indicated by dotted lines. The feature point positioning apparatus may include the feature extractor 120 configured to extract a nonlinear feature of an image to be detected, the updater 130 configured to iteratively update a form coefficient based on the nonlinear feature and a regression factor matrix obtained through training, and the position detector 140 configured to detect a position of the feature point of the image to be detected based on the updated form coefficient and a statistical form model obtained through training. The trainer 150 may train a statistical form model using, as a training sample, the image in which the feature point is represented. The trainer 150 may determine a nonlinear feature of the training sample, and determine the regression factor matrix based on the nonlinear feature and an extent to which an optimal or, alternatively, desired form coefficient of the training sample is updated. The storage 160 may store extra requirement information and the statistical form model obtained through training, and the image collector 110 may collect a video and/or an image. According to at least some example embodiments, examples of the storage 160 include volatile memory (e.g., random access memory (RAM,)) and/or non-volatile memory (e.g., flash memory).

According to at least one example embodiment of the inventive concepts, the feature point positioning apparatus may include or be implemented by one or more circuits or circuitry (e.g., hardware) specifically structured to carry out and/or control some or all of the operations described in the present disclosure as being performed by the feature point positioning apparatus (or an element thereof, e.g., the feature extractor 120, updater 130, position detector 140, image collector 110, trainer 150, and/or storage 160). According to at least one example embodiment of the inventive concepts, the feature point positioning apparatus may include or be implemented by a memory (e.g., storage 160) and one or more processors executing computer-readable code (e.g., software and/or firmware) that is stored in the memory and includes instructions for causing the one or more processors to carry out and/or control some or all of the operations described herein as being performed by the feature point positioning apparatus (or an element thereof, e.g., the feature extractor 120, updater 130, position detector 140, image collector 110, trainer 150, and/or storage 160). According to at least one example embodiment of the inventive concepts, the feature point positioning apparatus may be implemented by, for example, a combination of the above-referenced hardware and processors executing computer-readable code.

The one or more processors which may be included in the feature point positioning apparatus are hardware-implemented data processing devices having circuitry that is physically structured to execute desired operations including, for example, operations represented as code and/or instructions included in a program. Examples of the above-referenced hardware-implemented data processing devices include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

At least some example embodiments may provide a method of positioning a feature point corresponding to the feature point positioning apparatus. The method may include extracting a nonlinear feature of an image to be detected, iteratively updating a form coefficient based on the nonlinear feature and a regression factor matrix obtained through training, and detecting a position of the feature point of the image to be detected based on the updated form coefficient and a statistical form model obtained through training.

Figure 2A:
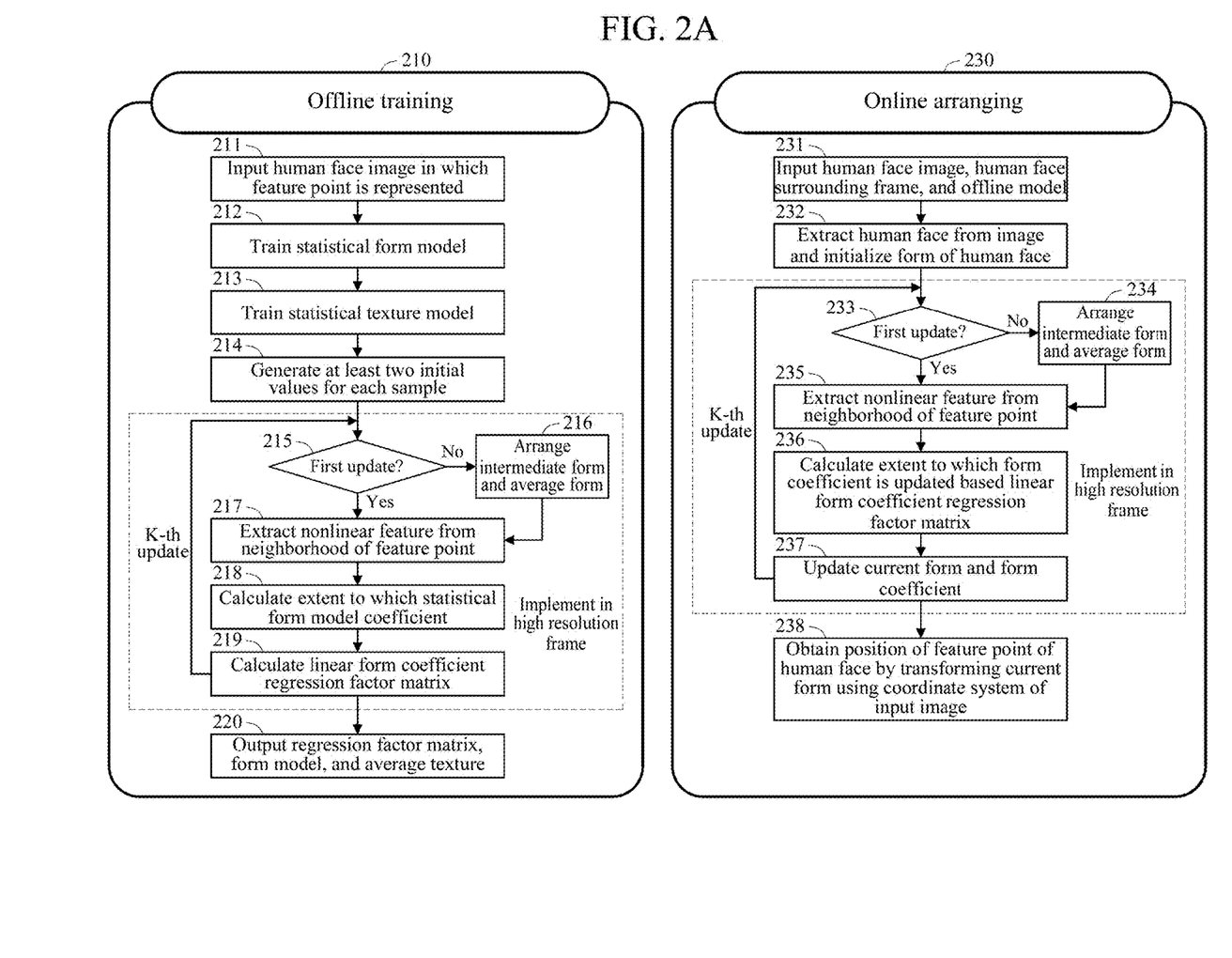
FIG. 2A is a flowchart illustrating a method of positioning a feature point according to at least one example embodiment.

FIG. 2A is a flowchart illustrating a method of positioning a feature point according to at least one example embodiment. In operation 210, offline training is performed. In operation 230, online arranging is performed. The offline training in operation 210 may include operations 211 through 220 which, according to at least some example embodiments, may be performed by the feature point positioning apparatus of FIG. 1.

In operation 211, a human face image in which a feature point is represented is input. In operation 212, a statistical form model is trained using the human face image in which the feature point is represented as a training sample. In operation 213, a statistical texture model is trained using the human face image in which the feature point is represented as the training sample such that operations 211 through 213 are selectively performed. In operation 214, at least two initial values for each sample are generated to increase a number of training samples. In operation 215, it is verified whether a current stage is first update. Subsequently, in operation 217, a nonlinear feature is directly extracted from a neighborhood of a current feature point in response to the current stage being first update. Otherwise, in operation 216, an intermediate form and an average form that were updated in a previous iteration are arranged, affine transformation is performed, and the nonlinear feature is extracted from a neighborhood of a feature point on which the affine transformation is performed in operation 217. In operation 218, an extent to which a statistical form model coefficient for a current form and an actual form is updated is calculated. In operation 219, a linear form coefficient regression factor matrix is calculated based on the nonlinear feature and an extent to which a form model coefficient is updated, an extent to which a form coefficient is updated is calculated based on the previously obtained linear form coefficient regression factor matrix and the nonlinear feature, and the current form is updated by updating a current form coefficient based on the extent to which the form coefficient is updated. Operations 215 through 219 are iteratively performed and then terminate when the form coefficient converges or operations 215 through 219 terminate when they have been performed a predetermined or, alternatively, desired number of times. Subsequently, operation 220 in which a regression factor matrix, a form model, and an average texture are output is performed.

Referring to FIG. 2A, the online arranging in operation 230 may include operations 211 through 220 which, according to at least some example embodiments, may be performed by the feature point positioning apparatus of FIG. 1.

In operation 231, a human face image, a frame surrounding a human face, and an offline model are input. In operation 232, an area of a human face is extracted from the image, and a size of the area of the human face is reduced to initialize a form of the human face. In operation 233, it is verified whether a current status is first update. Subsequently, in operation 235, a nonlinear feature is extracted from a neighborhood of a current feature point in response to the current status being first update. Otherwise, in operation 234, an intermediate form and an average form that are updated in a previous iteration are arranged, the affine transformation is performed on the image, and then the nonlinear feature is extracted from a neighborhood of a next current feature point. In operation 236, an extent to which a form coefficient is updated is calculated based on the nonlinear feature and a linear form coefficient regression factor matrix obtained through offline training. In operation 237, a current form is updated by updating a form coefficient based on the extent to which the form coefficient is calculated. Operations 233 through 237 are iteratively performed such that a final position of a feature point of a human face may be obtained when the current form is transformed using a coordinate system of an original input image in operation 238.

Figure 2B:
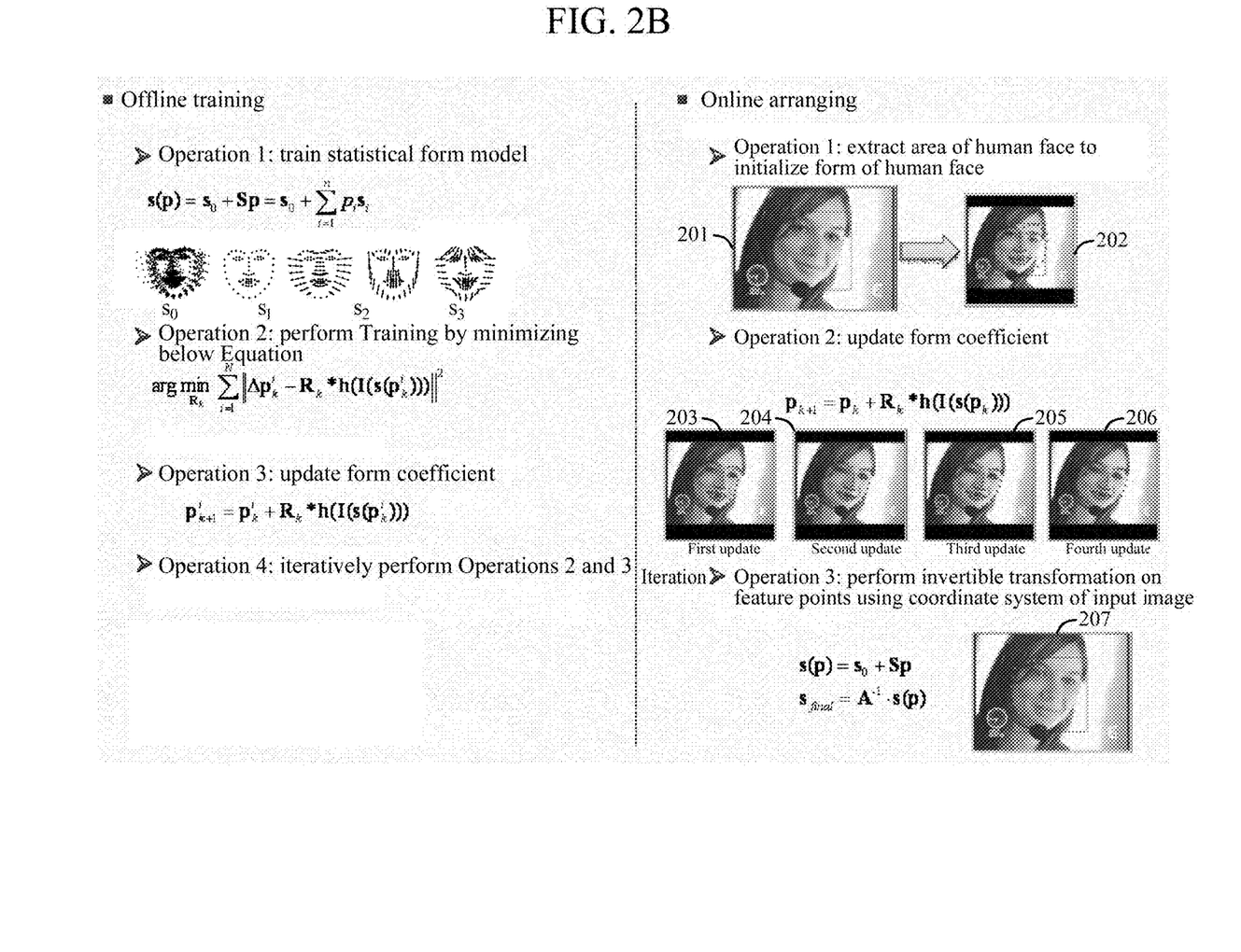
FIG. 2B illustrates a method of positioning a feature point according to at least one example embodiment.

FIG. 2B illustrates a key operation of the method of positioning the feature point of the human face. Similar or, alternatively, identical to FIG. 2A, FIG. 2B illustrates an operation of offline training and an operation of online arranging. The offline training may include operations indicated below which, according to at least some example embodiments, may be performed by the feature point positioning apparatus of FIG. 1.

Operation 1: a statistical form model is trained using Equation 1.

$$s(p) = s_0 + Sp = s_0 + \sum_{i=1}^{n} p_i s_i \qquad \text{[Equation 1]}$$

Here, $s_0$ denotes an average form, $p_i$ denotes a local form coefficient, and $s_i$ denotes a basic factor.

Operation 2: Training is performed by minimizing or, alternatively, reducing a target function of Equation 2.

$$\arg\min_{R_k} \sum_{i=1}^{N} \|\Delta p_k^i - R_k * h(I(s(p_k^i)))\|^2 \qquad \text{[Equation 2]}$$

Here, $\Delta p_k^i = p_*^i - p_k^i$, denotes an extent to which an optimal or, alternatively, desired form model coefficient is updated, $p_*^i$ denotes a form coefficient corresponding to a represented true form, $p_k^i$ denotes a form coefficient obtained at a time when k times of updates have been performed, and $h(I(s(p_k^i)))$ denotes a nonlinear feature extracted from the form coefficient $p_k^i$, of an image I.

Operation 3: a form coefficient is updated using Equation 3.

$$p_{k+1}^i = p_k^i + R_k * h(I(s(p_k^i))) \qquad \text{[Equation 3]}$$

Operation 4: Operations 2 and 3 are iteratively performed and then terminate when a form coefficient converges or operations 2 and 3 terminate when they have been performed a predetermined or, alternatively, desired number of times.

The online arranging may include operations indicated below.

Operation 1: an area of a human face is extracted from a source image to initialize a form of the area of the human face. For example, a left image 201 is the source image and a right image 202 is the initialized form of the human face.

Operation 2: as in the images 203 through 206, a form coefficient is iteratively updated until the form coefficient converges using Equation 4.

$$p_{k+1} = p_k + R_k * h(I(s(p_k^i))) \quad \text{[Equation 4]}$$

Operation 3: Based on Equation 5, a human face form is composed, and inverse transformation is performed on the composed image using a coordinate system of an input image, and then an image 207 of FIG. 2B is finally obtained.

$$s(p) = s_0 + Sp$$

$$s_{final} = A^{-1} \cdot s(p) \quad \text{[Equation 5]}$$

An entire flow of an algorithm has been introduced, and a detailed description of the algorithm which, according to at least some example embodiments, may be performed by the feature point positioning apparatus of FIG. 1, is provided below.

1. Training of Statistical Form Model

After a global similarity transformation element, for example, a rotation, a decrease, and a parallel movement, in a normal human face is eliminated, the scope of possible transformation of a human face form may be limited and a number of major change patterns may be small. At least some example embodiments may represent a form of the human face through a more detailed method. For example, at least some example embodiments may represent various forms of the human face using a fewer number of coefficients. Thus, the feature point positioning apparatus of FIG. 1 may require training of the statistical form model.

To precisely train the statistical form model, an input form of the human face may be standardized, and an influence on the global similarity transformation, for example, a Procrustes analysis, a rotation, and a decrease, may be eliminated. A related detailed procedure is described in T. F. Cootes and C. J. Taylor, Statistical Models of Appearance for Computer Vision, 2004.

After the human face form is standardized, the average form $s_0$ and a set of basic vectors, for example, the basic vector $s_i$, are obtained using a principal component analysis (PCA), and an additional four basic vectors may be required to perform global similarity transformation. In an average form, different weights may overlap such that a form of a predetermined or, alternatively, desired human face may be generated and the global similarity transformation may be additionally performed. The similarity transformation (e.g., $s^+$) may be expressed as shown in Equation 6.

$$s^+ = N \circ W(s_0; q, p) = N(W(s_0; q, p)) = N\left(s_0 + \sum_{i=1}^{n} p_i s_i; q\right) \quad \text{[Equation 6]}$$

Here, $p_i$ denotes a local form coefficient, q denotes a global similarity transformation coefficient, and $N(\cdot)$ denotes a global similarity transformation value with respect to a single point (x, y).

$$N(x, q) = \begin{pmatrix} (1+q_1) & -q_2 \\ q_2 & (1+q_1) \end{pmatrix} \begin{pmatrix} x \\ y \end{pmatrix} + \begin{pmatrix} q_3 \\ q_4 \end{pmatrix} \quad \text{[Equation 7]}$$

In particular, the global similarity transformation with respect to the average form may be expressed as shown in Equation 8.

$$N = (s_0; q) = s_0 + \sum_{i=1}^{4} q_i s_i^* \quad \text{[Equation 8]}$$

Here, each of four basic vectors $s_i^*$ may be expressed as $s_1^* = (x_1^0, y_1^0, \ldots, x_v^0, y_v^0)^T$, $s_2^* = (-y_1^0, x_1^0, \ldots, -y_v^0, x_v^0)^T$, $s_3^* = (1, 0, \ldots, 1, 0)^T$, $s_4^* = (0, 1, \ldots, 0, 1)^T$.

Figure 3:
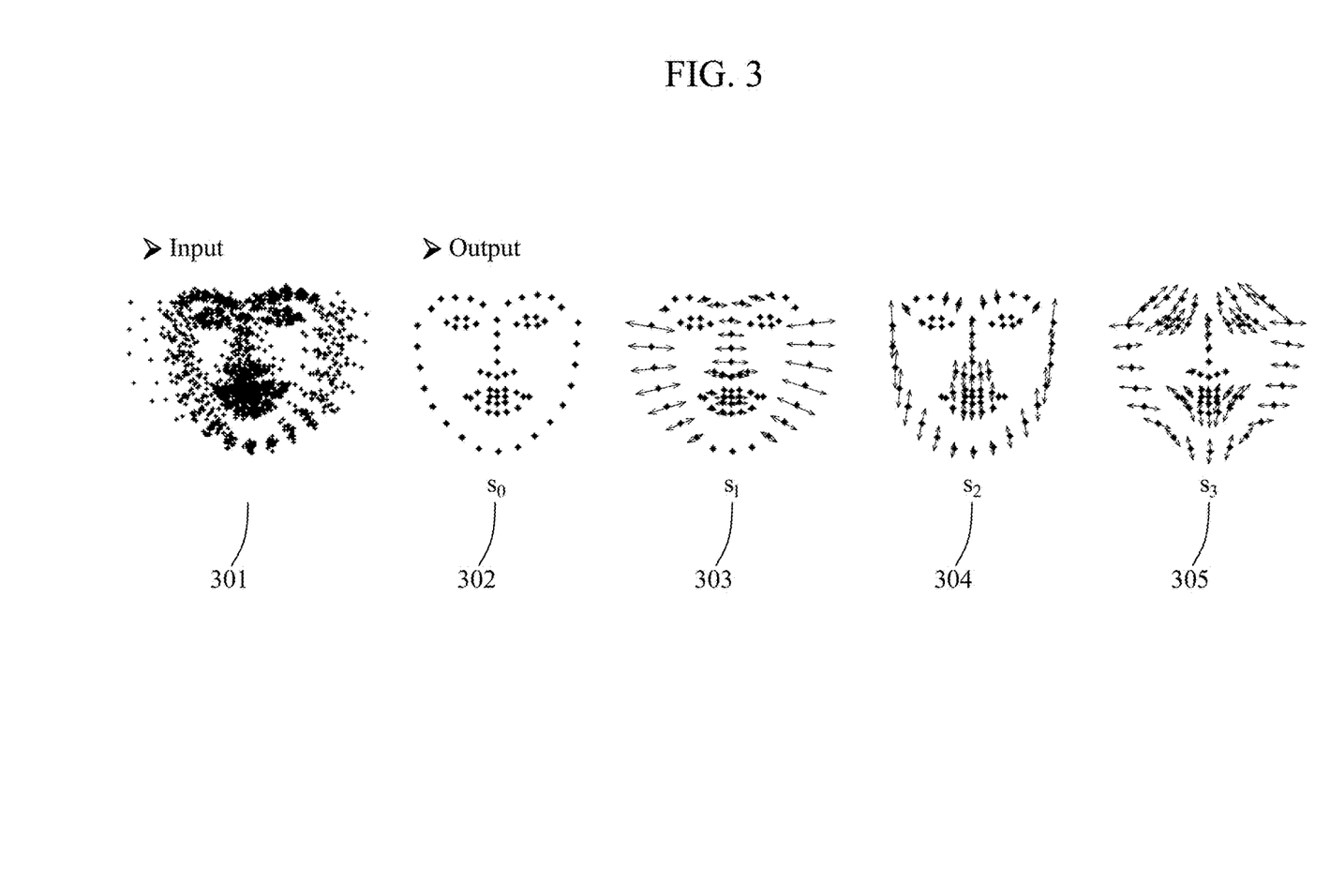
FIG. 3 illustrates a statistical form model according to at least one example embodiment.

FIG. 3 illustrates a statistical form model according to at least one example embodiment. An input image 301 is an image in which human face forms overlap after standardization is completed. Here, a distribution of feature points may be close in type to a Gaussian distribution. A second image 302 corresponds to an average form $s_0$, and a third image 303 is an image obtained by representing and overlapping three previous basic vectors to each average form. Small segments of lines having arrows may indicate basic vectors in FIG. 3. A first basic vector 303 represents a form changing when the human face horizontally rotates, a second basic vector 304 represents a form changing when the human face moves vertically, and a third basic vector 305 represents a form indicating a difference between a relatively overweight face and a relatively slim face. FIG. 3 illustrates an example of information represented based on a basic vector. However, in an actual application, the information is not limited to being represented on this basis.

When a single form of the human face is selected, a local form coefficient and a global similarity transformation coefficient may be obtained using Equation 9.

$$q_i = s_i^* \cdot (s^+ - s_0)$$

$$p_i = s_i \cdot (N(s^+; q)^{-1} - s_0) \quad \text{[Equation 9]}$$

Here, $N(s^+; q)^{-1}$ indicates inverse transformation to perform global similarity transformation of a fixed form, and the inverse transformation may be similar to form standardization.

2. Method of Arranging Human Face Forms Based on Statistical Form Model Coefficient Regression A basic idea of the method of arranging human face forms based on the statistical form model coefficient regression which, according to at least some example embodiments, may be performed by the feature point positioning apparatus of FIG. 1, relates to extracting a nonlinear feature from a neighborhood of each current feature point, combining the nonlinear feature and a single vector, and performing regression on an extent to which the statistical form model coefficient is updated based on the nonlinear feature.

$$p_{k+1} = p_k + R_k \phi_k \quad \text{[Equation 10]}$$

Here, $p_k$ denotes a form coefficient corresponding to a current form (form after an iterative update is performed k times), $\phi_k$ denotes a nonlinear feature extracted from the current form, and $R_k$ denotes a regression factor used after the iterative update is performed k times. For ease of description, $p_k$ indicates a combination of the local form coefficient and the similarity transformation coefficient.

To accurately perform an operation, it may be desirable or, alternatively, necessary to obtain the regression factor $R_k$ used for each of a number of iterations through data training. According to at least some example embodiments, the regression factor $R_k$ may be obtained by minimizing or, alternatively, reducing a target function of Equation 11.

$$\arg\min_{R_k} \sum_{i=1}^{N} \|\Delta p_k^i - R_k * \phi_k^i\|^2 \quad \text{[Equation 11]}$$

In Equation 11, N denotes a total number of training samples, $\Delta p_k^i = p_*^i - p_k^i$ denotes an extent to which an optimal or, alternatively, desired coefficient is updated (difference between actual form coefficient and current form coefficient) of an i-th sample after the iterative update is performed k number of times, and $\varnothing_k^i$ denotes a nonlinear feature of the i-th sample when the iterative update is performed k number of times. According to a least square method, Equation 11 may be expressed as shown in Equation 12.

$$R_k = \Delta p_k \cdot \phi_k^T \cdot (\phi_k \cdot \phi_k^T)^{-1} \quad \text{[Equation 12]}$$

An extra target function and a solution method may be used in addition to the target function and the solution method according to at least some example embodiments described above. For example, the linear regression may be replaced with a ridge regression, and the nonlinear feature may be applied to a space of a texture model. Detailed description is provided with reference to Table 1.

TABLE 1

Target function and solution method of statistical model coefficient regression (SMCR) algorithm

| Cost function | Solution | AvgNorm Err on LFPW | AvgNorm Err on iBUG | Remark |
|---|---|---|---|---|
| $\arg\min_{R_k} \sum_{i=1}^{N} \|\Delta p_k^i - R_k \cdot P \cdot (\phi_k^i - \bar{\phi}_*)\|^2$ | $R_k = \Delta p_k \cdot \Phi_{Pk}^T \cdot (\Phi_{Pk} \cdot \Phi_{Pk}^T)^{-1}$ | No variance/ no conversion | | No conversion of linear regression |
| | $R_k = \Delta p_k \cdot \Phi_{Pk}^T \cdot (\Phi_{Pk} \cdot \Phi_{Pk}^T + \lambda E)^{-1}$ | 0.0497 | 0.1323 | Conversion is possible only by ridge regression |
| $\arg\min_{R_k} \sum_{i=1}^{N} \|\Delta p_k^i - R_k \cdot (\phi_k^i - \bar{\phi}_*)\|^2$ | $R_k = \Delta p_k \cdot \Phi_k^T \cdot (\Phi_k \cdot \Phi_k^T)^{-1}$ $R_k = \Delta p_k \cdot \Phi_k^T \cdot (\Phi_k \cdot \Phi_k^T + \lambda E)^{-1}$ | 0.0496 0.0498 | 0.1308 0.1311 | Conversion is possible by two regressions |
| $\arg\min_{R_k} \sum_{i=1}^{N} \|\Delta p_k^i - R_k * \phi_k^i\|^2$ | $R_k = \Delta p_k \cdot \varphi_k^T \cdot (\varphi_k \cdot \varphi_k^T)^{-1}$ | 0.0498 | 0.1296 | Work well using simple cost function, and cost function is used as basic cost function of SMCR algorithm |

Definition:
Optimal form coefficient update extent: $\Delta p_K = \lfloor \Delta p_k^1, \ldots, \Delta p_k^N \rfloor$
Extracted nonlinear feature: $\varphi_k^f = h(I(s(p_k^f)))$
Project-out operator: $P = E - AA^T$
Identity matrix: E
Average texture of all training images: $\bar{\varphi}_*$
Ensemble of projected-out-feature: $\Phi_{Pk} = P \cdot \lfloor \varphi_k^1 - \bar{\varphi}_*, \ldots, \varphi_k^N - \bar{\varphi}_* \rfloor$
Ensemble of feature: $\Phi_k = \lfloor \varphi_k^1 - \varphi_*, \ldots, \varphi_k^N - \varphi_* \rfloor$
Ensemble of raw feature: $\varphi_k = \lfloor \varphi_k^1, \ldots, \varphi_k^N \rfloor$ Based on an identical code frame, the SMCR algorithm may be compared to a supervised descent algorithm, and a result of the comparing is as shown in Table 2. The result of the comparing indicates an accuracy of two data bases, for example, labeled face parts in the wild (LFPW) and intelligent behavior understanding group (iBUG), of the SMCR algorithm is greater than an accuracy of the supervised descent algorithm.

TABLE 2

Comparison between SMCR algorithm and supervised descent algorithm SMCR algorithm

| Cost function | Solution | AvgNorm Err on LFPW | AvgNorm Err on iBUG | Remark |
|---|---|---|---|---|
| $\arg\min_{R_k} \sum_{i=1}^{N} \|\Delta p_k^i - R_k \cdot P \cdot (\phi_k^i - \bar{\phi}_*)\|^2$ | $R_k = \Delta p_k \cdot \Phi_{Pk}^T \cdot (\Phi_{Pk} \cdot \Phi_{Pk}^T)^{-1}$ | No variance/ no conversion | | No conversion of linear regession |
| | $R_k = \Delta p_k - \Phi_{Pk}^T \cdot (\Phi_{Pk} \cdot \Phi_{Pk}^T + \lambda E)^{-1}$ | 0.0497 | 0.1323 | Conversion is possible only by ridge regression |
| $\arg\min_{R_k} \sum_{i=1}^{N} \|\Delta p_k^i - R_k \cdot (\phi_k^i - \bar{\phi}_*)\|^2$ | $R_k = \Delta p_k \cdot \Phi_k^T \cdot (\Phi_k \cdot \Phi_k^T)^{-1}$ $R_k = \Delta p_k \cdot \Phi_k^T \cdot (\Phi_k \cdot \Phi_k^T + \lambda E)^{-1}$ | 0.0496 0.0498 | 0.1308 0.1311 | Conversion is possible by two regressions |

Supervised descent algorithm: the supervised descent algorithm is similar to the SMCR algorithm. In the supervised descent algorithm p is replaced with x.

TABLE 3

| Cost function | Solution | AvgNorm Err on LFPW | AvgNorm Err on iBUG | Remark |
|---|---|---|---|---|
| $\operatorname*{argmin}_{R_k} \sum_{i=1}^{N} \|\Delta x_k^i - R_k \cdot P \cdot (\phi_k^i - \bar{\phi}_*)\|^2$ | $R_k = \Delta x_k \cdot \Phi_{Pk}^T \cdot (\Phi_{Pk} \cdot \Phi_{Pk}^T)^{-1}$ | No variance/ no conversion | | No conversion of linear regression |
| | $R_k = \Delta x_k \cdot \Phi_{Pk}^T \cdot (\Phi_{Pk} \cdot \Phi_{Pk}^T + \lambda E)^{-1}$ | 0.0524 | 0.1315 | Conversion is possible only by ridge regression |
| $\operatorname*{argmin}_{R_k} \sum_{i=1}^{N} \|\Delta x_k^i - R_k \cdot (\phi_k^i - \bar{\phi}_*)\|^2$ | $R_k = \Delta x_k \cdot \Phi_k^T \cdot (\Phi_k \cdot \Phi_k^T)^{-1}$ | 0.0522 | 0.1309 | Conversion is possible by two regessions |
| | $R_k = \Delta x_k \cdot \Phi_k^T \cdot (\Phi_k \cdot \Phi_k^T + \lambda E)^{-1}$ | 0.0524 | 0.1312 | |

3. Rearrangement of Intermediate Result

Figure 4A:
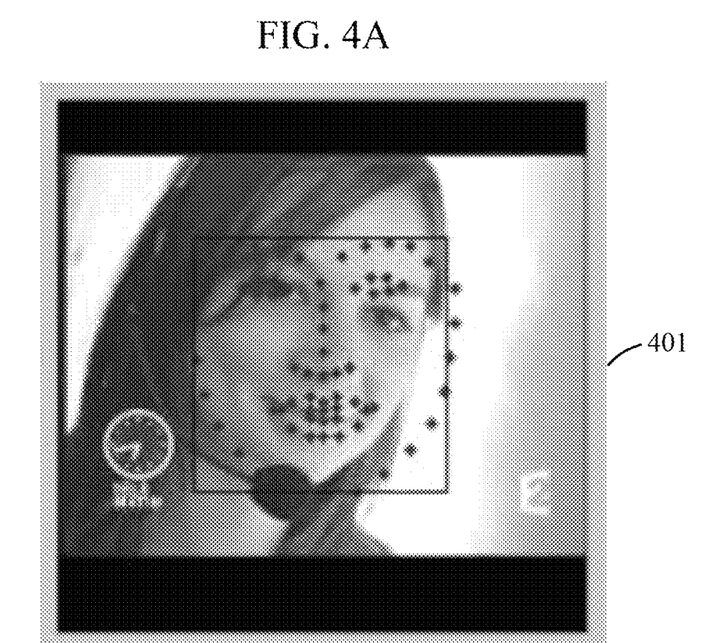
FIGS. 4A and 4B each illustrate an initial form of a feature point and a form obtained after a first iterative update is performed on the feature point in low resolution according to at least one example embodiment.
Figure 4B:
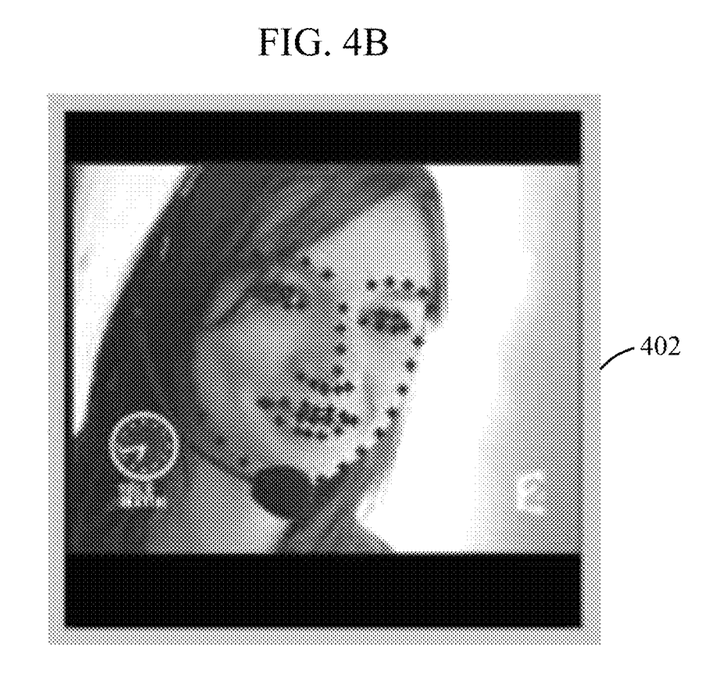

Actual training and an actual test result indicate that a form obtained through first and second initial updates is similar to an actual form. Referring to FIGS. 4A and 4B, FIG. 4A illustrates an initial form and FIG. 4B illustrates a form obtained after a first update is performed. In response to a predetermined or, alternatively, desired rotation being present in a human face of an image, the face image may not be correctable when a nonlinear feature is extracted from a subsequent update even though the rotation is detected.

Figure 5:
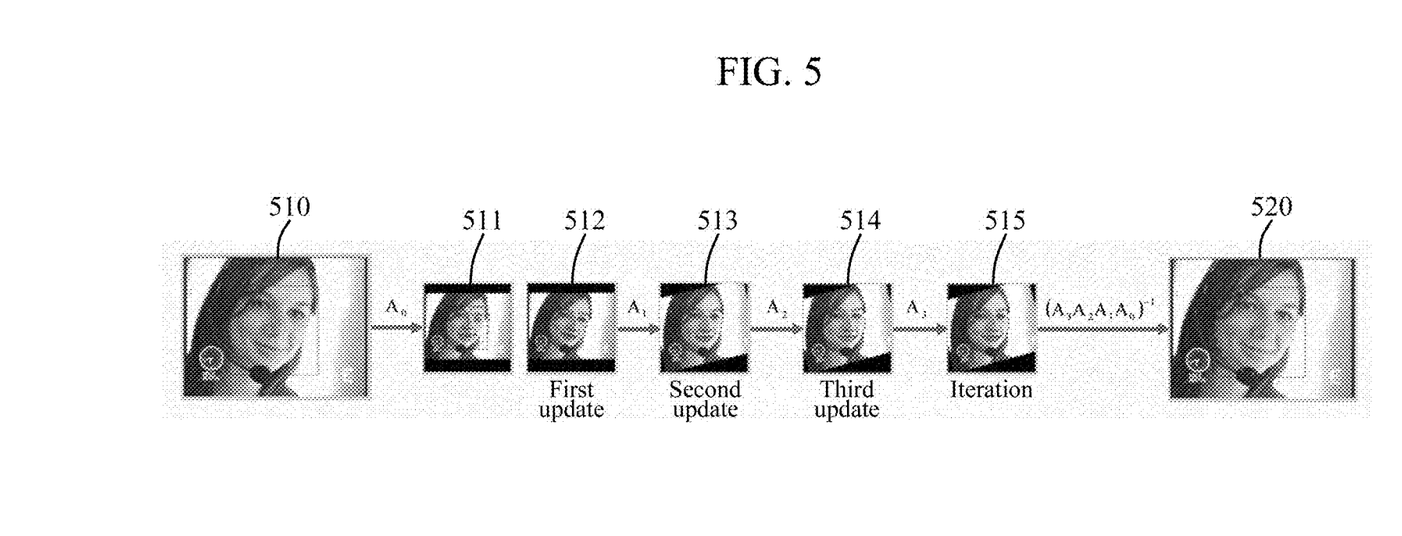
FIG. 5 illustrates an iterative update according to at least one example embodiment.

FIG. 5 is a flowchart illustrating an example of an arranged human face arranged by adding an intermediate result using a human face arrangement algorithm which, according to at least some example embodiments, may be performed by the feature point positioning apparatus of FIG. 1.

Based on the foregoing observation, at least some example embodiments may arrange a current face form and an average face form and minimize or, alternatively, reduce the below target function by searching for a global similarity transformation matrix $A_k$ every time an iterative update is performed.

$$\operatorname*{argmin}_{A_k} \|s_o - A_k \cdot s(p_k^i)\|^2$$

Here, $s(p_k^i)$ denotes a form of an i-th sample after an iterative update is performed k times. After the global similarity transformation matrix $A_k$ is obtained, global similarity transformation may be performed on a current form and an image and then subsequent iterative updates are performed (see, for example, images 511 through 515). Thus, a disadvantageous effect caused by a rotation and a reduction of an image may be eliminated and thereby the extracted nonlinear feature may reflect a different position between feature points.

4. High Resolution Extension

Figure 6:
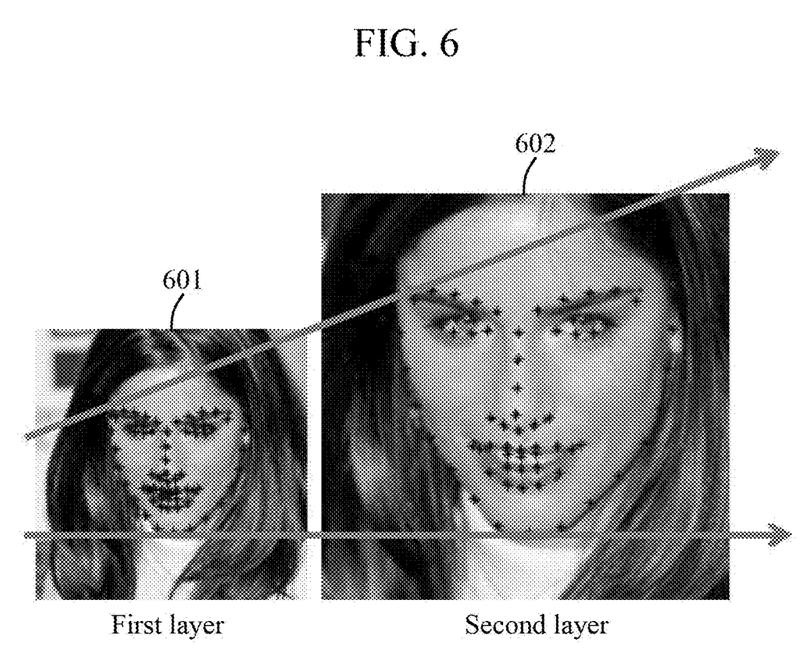
FIG. 6 illustrates a high resolution statistical model coefficient regression (SMCR) algorithm according to at least one example embodiment.

FIG. 6 illustrates an example of an image indicating a high resolution extension according to at least one example embodiment.

A high resolution frame may be usually used in a multi view algorithm for a balance of an accuracy and a speed. The human face algorithm according to at least some example embodiments, which may be performed by the feature point positioning apparatus of FIG. 1, may similarly or, alternatively, identically adopt a high resolution frame. An image 601 indicates that a human face feature point positioning is performed on an image of which a resolution is relatively low. An image 602 indicates a result of the human face feature point positioning in an image of which the resolution is relatively high and that then an accuracy positioning is iteratively performed.

Figure 7:
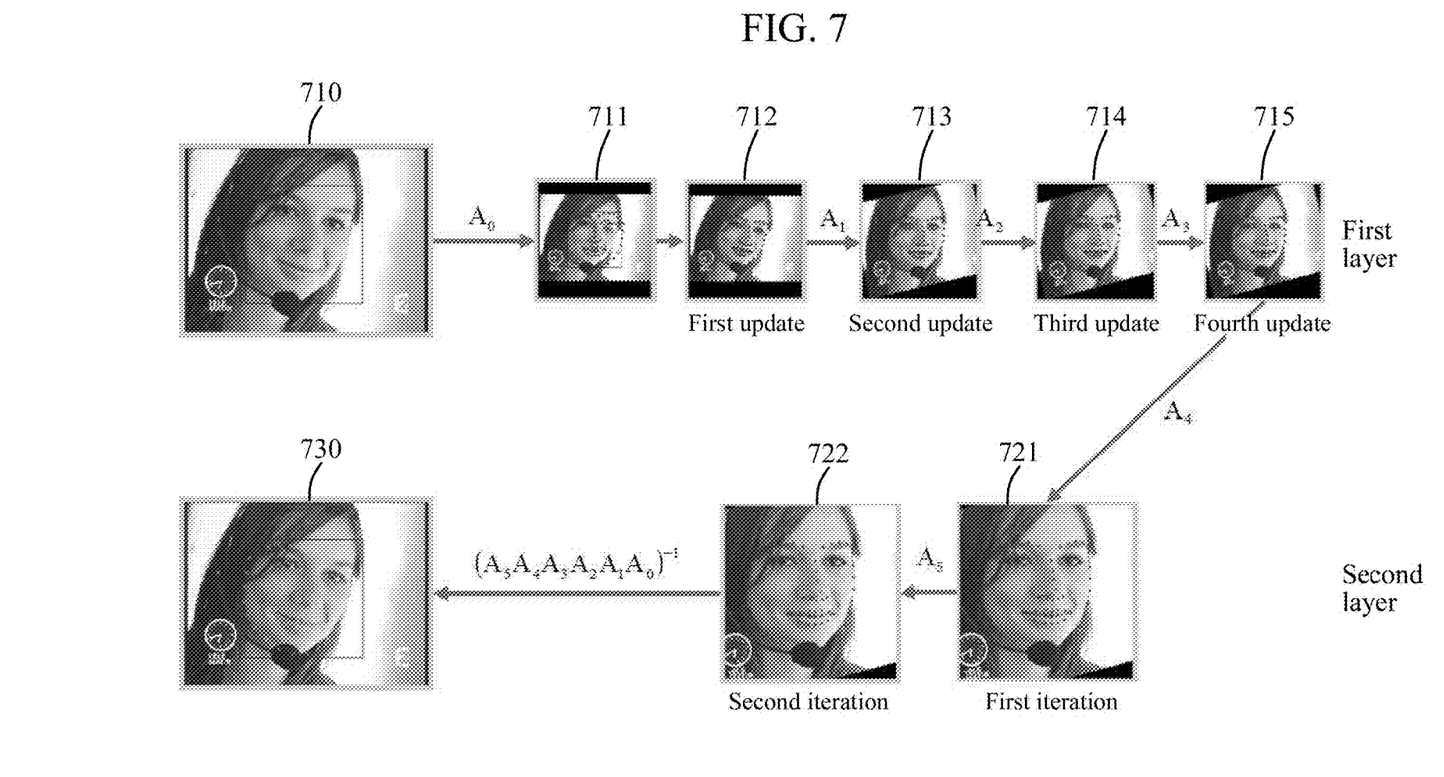
FIG. 7 is a flowchart illustrating a high resolution SMCR algorithm in which algorithms of FIGS. 4A through 6 are combined according to at least one example embodiment.

Lastly, FIG. 7 is a flowchart of a high resolution statistical model coefficient regression (SMCR) algorithm also showing a rearrangement of the intermediate result. The SMCR illustrated in FIG. 7, according to at least some example embodiments, may be performed by the feature point positioning apparatus of FIG. 1. Images 711 through 715 indicate iterative updates of the aforementioned low resolution image, and images 721 and 722 indicate iterative positioning of the high resolution image.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A feature point positioning apparatus comprising:
a memory storing computer-executable instructions; and
one or more processors configured to execute the computer-executable instructions such that the one or more processors are configured to,
iteratively update a first form coefficient based on,
a nonlinear feature extracted from an image, and
a regression factor matrix obtained through training, and
detect a position of the feature point of the image based on,
the updated first form coefficient, and
a statistical form model obtained through training.

2. The feature point positioning apparatus of claim 1, wherein the one or more processors are configured to execute the computer-executable instructions such that the one or more processors are configured to obtain a similarity transformation matrix by arranging an intermediate form and an average form obtained through an update, and perform a similarity transformation on the intermediate form and the image based on the similarity transformation matrix.

3. The feature point positioning apparatus of claim 2, wherein the one or more processors are configured to execute the computer-executable instructions such that the one or more processors are configured to,
arrange the intermediate form and the average form obtained through the update using a high resolution pyramid frame,
perform positioning on a feature point of a first resolution image based on a threshold, and
obtain the similarity transformation matrix by performing positioning on a feature point of a second resolution image and mapping, to the second resolution image, a result of the performing of the positioning on the feature point of the first resolution image, and a second resolution is higher than a first resolution.

4. The feature point positioning apparatus of claim 3, wherein the one or more processors are configured to execute the computer-executable instructions such that the one or more processors are configured to perform inverse transformation, using a coordinate system of the image, on a feature point obtained based on the similarity transformation matrix obtained through an iterative update.

5. The feature point positioning apparatus of claim 2, wherein,
the one or more processors are configured to execute the computer-executable instructions such that the one or more processors are configured to obtain a similarity transformation matrix $A_k$ used for a k-th iterative update of the first form coefficient using a target function arg $\min_{A_k} \|S_O - A_k \cdot s(P_k^i)\|^2$,
$S_O$ denotes an average form, and
$s(P_k^i)$ is an i-th sample form after the iterative update is performed k times.

6. The feature point positioning apparatus of claim 1, wherein the one or more processors are configured to execute the computer-executable instructions such that the one or more processors are configured to determine the regression factor matrix based on the nonlinear feature and an extent to which a second form coefficient of a training sample is updated.

7. The feature point positioning apparatus of claim 6, wherein the one or more processors are configured to execute the computer-executable instructions such that the one or more processors are configured to learn an average texture feature from the training sample and determine a value of a difference between the average texture feature and a nonlinear texture feature extracted from the training sample as a nonlinear feature of the training sample.

8. The feature point positioning apparatus of claim 6, wherein the one or more processors are configured to execute the computer-executable instructions such that the one or more processors are configured such that a nonlinear texture feature is one type of the nonlinear texture feature or a combination of at least two types of the nonlinear texture feature, and the one or more processors use, in different iterations, the combination of at least two types of the nonlinear texture feature or identical nonlinear texture features and different nonlinear texture features.

9. The feature point positioning apparatus of claim 6, wherein the one or more processors are configured to execute the computer-executable instructions such that the one or more processors are configured to determine the regression factor matrix by minimizing an error between the extent to which the second form coefficient is updated and an extent to which a third form coefficient is updated, calculated based on the nonlinear feature.

10. The feature point positioning apparatus of claim 9 wherein,
the one or more processors are configured to execute the computer-executable instructions such that the one or more processors are configured to obtain a regression factor matrix $R_k$ used for a k-th iterative update of the third form coefficient using a target function arg $\min_{R_k} \Sigma_{i=1} \|\Delta p_k^i - R_k * \emptyset_k^i\|^2$, N denotes a total number of training samples, $\Delta p_k^i = p_*^i - p_k^i$, denotes the extent to which the second form coefficient of an i-th sample is updated when the iterative update is performed k times, $\varnothing_k^i$ denotes a nonlinear feature of the i-th sample when the iterative update is performed k times, and $R_k * \varnothing_k^i$ denotes the extent to which the third form coefficient is updated, obtained and calculated based on the nonlinear feature of the i-th sample, when the iterative update is performed k times.

11. A method of positioning a feature point, the method comprising:
   extracting a nonlinear feature of an image;
   iteratively updating a first form coefficient based on the nonlinear feature and a regression factor matrix obtained through training; and
   detecting a position of a feature point of the image based on the updated first form coefficient and a statistical form model obtained through training.

12. The method of claim 11, wherein the updating comprises:
   obtaining a similarity transformation matrix by arranging an intermediate form and an average form obtained through an update; and
   performing a similarity transformation on the intermediate form and the image based on the similarity transformation matrix.

13. The method of claim 12 wherein,
   the obtaining comprises:
      arranging the intermediate form and the average form obtained through the update using a high resolution pyramid frame;
      performing positioning on a feature point of a first resolution image based on a threshold; and
      performing positioning on a feature point of a second resolution image by mapping, to a second resolution image, a result of the performing positioning on a feature point of a first resolution image, and
   a resolution of the second resolution image is higher than a resolution of the first resolution image.

14. The method of claim 13, further comprising:
   performing inverse transformation, using a coordinate system of the image, on a feature point obtained based on the similarity transformation matrix obtained through an iterative update.

15. The method of claim 12 wherein,
   a similarity transformation matrix $A_k$ used for a k-th iterative update of the first form coefficient is obtained using a target function $\arg \min_{A_k} \| S_0 - A_k \cdot s(P_k^i) \|^2$,
   $S_0$ denotes an average form, and
   $s(P_k^i)$ is an i-th sample form after the iterative update is performed k times.

16. The method of claim 11, further comprising:
   determining a nonlinear feature of a training sample; and
   obtaining the regression factor matrix based on the nonlinear feature of the training sample and an extent to which a second form coefficient of the training sample is updated.

17. The method of claim 16, wherein the nonlinear feature of the training sample includes a nonlinear texture feature, and the determining of the nonlinear feature of the training sample includes learning an average texture feature from the training sample, and determining a value of a difference between the average texture feature and a nonlinear texture feature extracted from the training sample as a nonlinear feature of the training sample.

18. The method of claim 16, wherein a nonlinear texture feature is a combination of at least one type of the nonlinear texture feature, and the combination of at least one type of the nonlinear texture feature is used when the iterative update is performed.

19. The method of claim 16, wherein the obtaining comprises:
   determining the regression factor matrix by minimizing an error between the extent to which the second form coefficient is updated and an extent to which a third form coefficient is updated, calculated based on the nonlinear feature of the training sample.

20. The method of claim 19, wherein,
   a regression factor matrix $R_k$ used for a k-th iterative update of the third form coefficient is obtained using a target function $\arg \min_{R_k} \sum_{i=1}^{N} \| \Delta p_k^i - R_k * \varnothing_k^i \|^2$,
   N denotes a total number of training samples,
   $\Delta p_k^i = p_*^i - p_k^i$ denotes the extent to which the second form coefficient of an i-th sample is updated when the iterative update is performed k times,
   $\varnothing_k^i$ denotes a nonlinear feature of the i-th sample when the iterative update is performed k times, and
   $R_k * \varnothing_k^i$ denotes the extent to which the third form coefficient is updated, obtained and calculated based on the nonlinear feature of the i-th sample, when the iterative update is performed k times.

* * * * *

UNITED STATES PATENT AND TRADEMARK OFFICE
CERTIFICATE OF CORRECTION

| | | |
|---|---|---|
| PATENT NO. | : 10,096,132 B2 | Page 1 of 1 |
| APPLICATION NO. | : 15/416271 | |
| DATED | : October 9, 2018 | |
| INVENTOR(S) | : Mingcai Zhou et al. | |

It is certified that error appears in the above-identified patent and that said Letters Patent is hereby corrected as shown below:

On the Title Page

Item (30) Foreign Application Priority Data should be corrected to read:
Jan. 27, 2016 (CN) ........................... 2016 1 00534559
Oct. 05, 2016 (KR) .......................... 10 2016 0128386

Signed and Sealed this
Sixteenth Day of April, 2019

Andrei Iancu
*Director of the United States Patent and Trademark Office*